(12) United States Patent
Allen et al.

(10) Patent No.: US 12,529,398 B2
(45) Date of Patent: Jan. 20, 2026

(54) EXTERNAL SEAL INTERFACE ON RACEWAY

(71) Applicant: Schaeffler Technologies AG & Co. KG, Herzogenaurach (DE)

(72) Inventors: Natalie Allen, Richfield, OH (US); Joshua Verdier, Lodi, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 177 days.

(21) Appl. No.: 18/517,506

(22) Filed: Nov. 22, 2023

(65) Prior Publication Data

US 2025/0163965 A1 May 22, 2025

(51) Int. Cl.
*F16C 19/30* (2006.01)
*F16C 33/58* (2006.01)
*F16C 33/78* (2006.01)

(52) U.S. Cl.
CPC .......... *F16C 33/783* (2013.01); *F16C 19/305* (2013.01); *F16C 33/586* (2013.01); *F16C 33/588* (2013.01)

(58) Field of Classification Search
CPC ........ F16C 19/30; F16C 19/305; F16C 19/46; F16C 33/7826; F16C 33/783; F16C 33/7886; F16C 2360/23; F16H 41/00; F16H 41/02; F16H 41/04; F16H 41/24; F16H 45/02

See application file for complete search history.

(56) References Cited

U.S. PATENT DOCUMENTS

| | | | | |
|---|---|---|---|---|
| 4,162,119 | A | * | 7/1979 | Goodman ............ G02B 6/3897 385/60 |
| 2006/0140527 | A1 | * | 6/2006 | Takamizawa ........... F16C 19/30 384/620 |
| 2016/0116037 | A1 | * | 4/2016 | Depraete ................. F16H 45/02 29/889.5 |

FOREIGN PATENT DOCUMENTS

| | | | |
|---|---|---|---|
| DE | 102008025058 A1 | 12/2009 | |
| JP | 2004316783 A | * 11/2004 | ............. F16H 45/02 |
| JP | 2004324744 A | * 11/2004 | ......... F16D 25/0635 |

* cited by examiner

*Primary Examiner* — Phillip A Johnson
(74) *Attorney, Agent, or Firm* — Volpe Koenig

(57) ABSTRACT

A torque converter including a thrust bearing having an extended race functioning as part of a seal gland for a dynamic seal thereby eliminating the need for an separate seal retainer plate. In some examples, the bearing provides the outer diameter sealing surface in addition to a retention feature for a spring energized seal.

18 Claims, 3 Drawing Sheets

EXTERNAL SEAL INTERFACE ON RACEWAY

TECHNICAL FIELD

The present disclosure is directed to a torque converter, and is more particularly related to a micro torque converter.

BACKGROUND

FIG. 1 illustrates a general block diagram showing the relationship of an engine 7, torque converter 10, transmission 8, and differential/axle assembly 9 in a typical vehicle. It is well known that a torque converter is used to transmit torque from an engine to a transmission of a motor vehicle.

The torque converter includes three main components: a pump, a turbine, and a stator. The torque converter becomes a sealed chamber when the pump is welded to a cover. The cover is connected to a flexplate which is, in turn, bolted to a crankshaft of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

A fluid circuit is created by the pump (sometimes called an impeller), the turbine, and the stator (sometimes called a reactor). The fluid circuit allows the engine to continue rotating when the vehicle is stopped, and accelerate the vehicle when desired by a driver.

The turbine uses the fluid energy it receives from pump to propel the vehicle. An output shaft is connected to the wheels of the vehicle through gears and shafts in transmission 8 and axle differential 9. The force of the fluid impacting the turbine blades is output from the turbine as torque. Axial thrust bearings support the components from axial forces imparted by the fluid. When output torque is sufficient to overcome the inertia of the vehicle at rest, the vehicle begins to move.

Peak torque converter efficiency is generally limited to 92-93% based on losses in the fluid. Therefore, a torque converter clutch is employed to mechanically connect the torque converter input to the output, improving efficiency to 100%. A clutch piston plate is hydraulically applied when commanded by a transmission controller. In some configurations, the piston plate is sealed to the turbine hub at its inner diameter by an o-ring or other sealing element and to the cover at its outer diameter by a friction material ring. In other torque converters, a separate seal retainer plate must be used to retain the o-ring. These seals create a pressure chamber and force the piston plate into engagement with the cover. This mechanical connection bypasses the torque converter fluid circuit.

Micro torque converters are relatively small torque converters that are often used in applications with lower power demands. Micro torque converters generally include the same components as the torque converter described above but in a smaller form factor. The smaller form factor can present challenges with respect to manufacturing and assembly.

In some torque converters and micro torque converters, there needs to be a dynamic seal between the torque converter cover and the input shaft to separate the torque converter clutch apply chamber. In a normal torque converter, a seal groove is typically machined into the shaft. However, due to the small diameter of the input shaft of a micro torque converter and the number of flow paths that need to be drilled through the center of it, there would not be adequate material thickness between the seal groove and the drilled holes. Accordingly, the seal groove is provided on the inner diameter of the torque converter cover.

Due to the relative rotational motion between these parts, a dynamic seal must be used. These seals are very stiff and are not able to be installed into a regular groove on the torque converter cover. Instead, half of the groove is machined into the cover, then the seal is installed, then an additional seal retainer plate is secured onto the other side of the groove. This is also known as a clip seal. Axial space is extremely limited in such micro torque converters. Accordingly, installation of the seal retainer plate is also limited.

SUMMARY

Embodiments according to this disclosure provide a thrust bearing having an extended race functioning as part of a seal gland for a dynamic seal thereby removing the need for an additional seal retainer plate to be installed. In some embodiments, the bearing provides the outer diameter sealing surface in addition to a retention feature for a spring energized seal.

In accordance with one aspect of the present disclosure, a torque converter comprises a cover, an input shaft supported for rotation within the cover, a bearing coaxially-aligned with a portion of the input shaft, a hub surrounding the input shaft, and a seal element interposed between the input shaft and the hub. The bearing includes a seal retaining flange adapted to cooperate with the hub to define a seal groove in which the seal element is retained.

The bearing can be a thrust bearing and can include an outer race, and the seal retaining flange can extend from the outer race. The seal retaining flange can include a radially-inwardly extending flange. The radially-inwardly extending flange can include an axial end face adapted to engage the seal element. The outer race can be L-shape in cross-section. The seal element can include at least one of a square dynamic seal or an o-ring. The outer race can include a plurality of circumferentially-spaced apart retainer tabs. The retainer tabs can be stamped. The seal retaining flange can further include an axially-extending flange extending from the radially-inwardly extending flange. The axially-extending flange can include an inner circumferential surface adapted to engage the seal element. The outer race can be S-shape in cross-section. The seal element can include a spring energized seal.

In accordance with another aspect, a bearing comprises an inner race, an outer race, and a plurality of rolling elements supported between the inner and outer races. The outer race includes a seal retaining flange extending radially inwardly beyond the inner race for retaining an associated seal element.

The seal retaining flange can include a radially-inwardly extending flange. The radially-inwardly extending flange can include an axial end face adapted to engage the associated seal element. The outer race can be L-shape in cross-section. The seal retaining flange can further include an axially-extending flange extending from the radially-inwardly extending flange. The axially-extending flange can include an inner circumferential surface adapted to engage the associated seal element. The outer race can be S-shape in cross-section.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
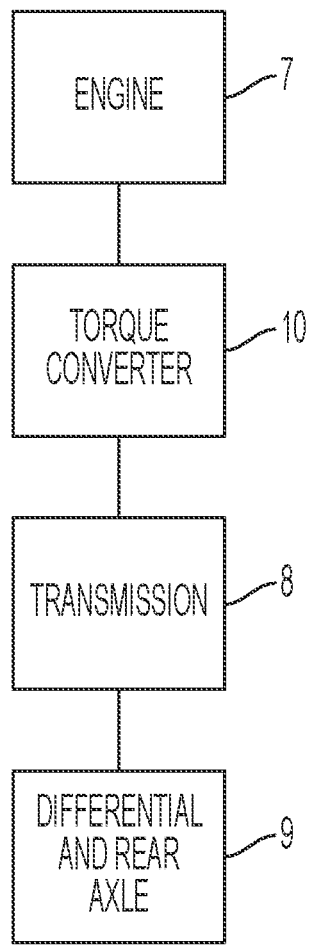
FIG. 1 is a block diagram of a vehicle drive system.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 2:
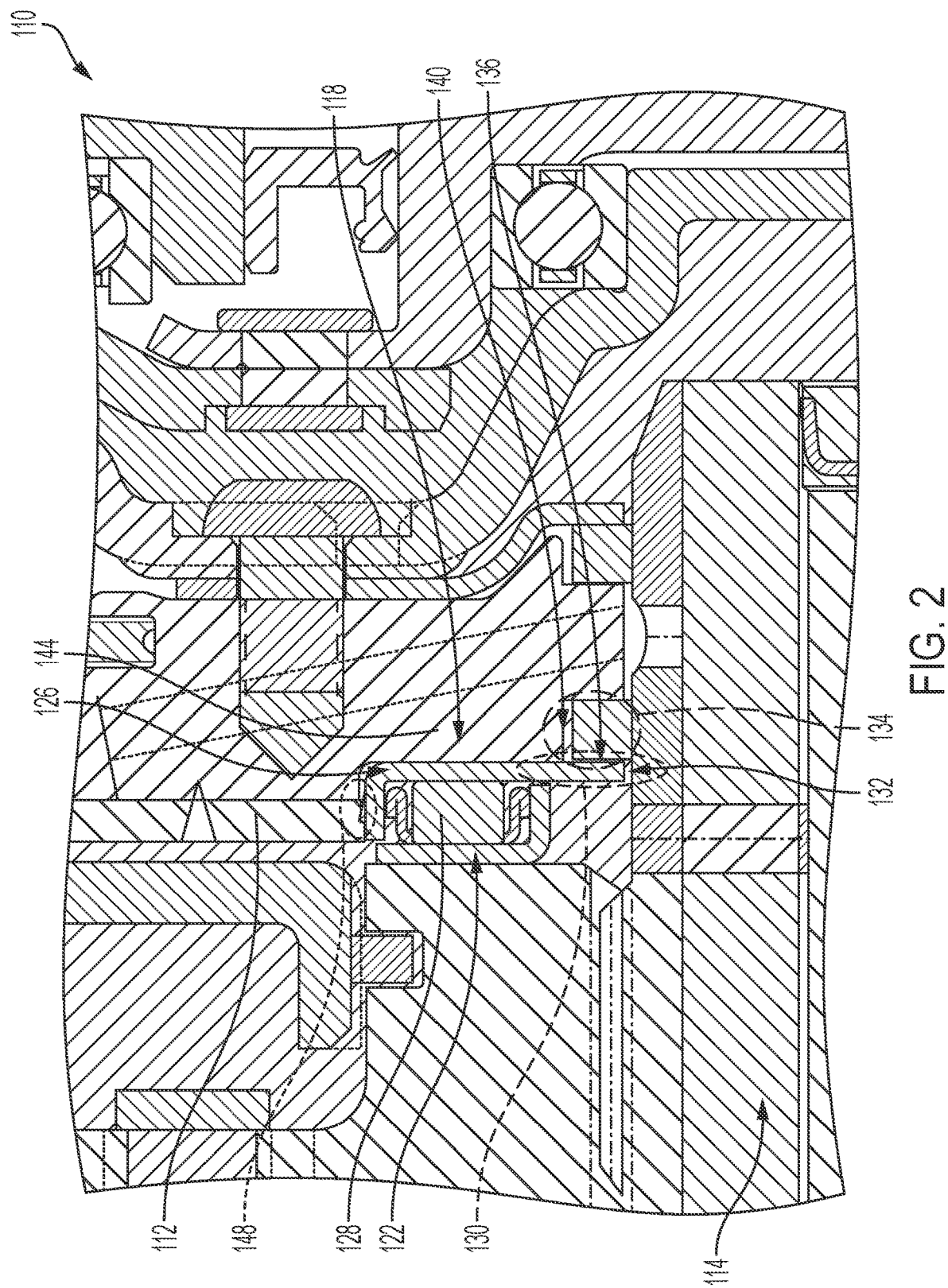
FIG. 2 is a cross-sectional view of a portion of an exemplary torque converter in accordance with the present disclosure.

Referring to FIG. 2, an enlarged cross-sectional view of a portion of a micro torque converter is illustrated and identified generally by reference numeral 110. It will be appreciated that the micro torque converter 110 can be part of a vehicle transmission assembly and can include the general components described above. Further, it should be understood the present disclosure is directed to a sealing arrangement for providing a dynamic seal between a rotating component and an adjacent non-rotating (fixed) component of a micro torque converter, but that aspects of the present disclosure can be utilized in other types of assemblies in addition to micro torque converter.

The micro torque converter 110 generally includes a housing 112 (e.g., cover) and an input shaft 114 supported for rotation within the cover 112. A thrust bearing 118 is supported within the cover 112 coaxially with the input shaft 114 and includes an inner race 122, an outer race 126 and a plurality of rolling elements 128. The outer race 126 is annular and includes a radially-inwardly extending sealing flange 130. A radially-inner circumferential surface 132 of the sealing flange 130 approaches an outer circumference of the input shaft 114. In this embodiment, the sealing flange 130 extends radially-inwardly beyond the radial extent of the inner race 122 approximately 50% of the radial extent of the inner race 122.

A seal element 134 is captured in a seal groove defined by an axial end face 136 of the sealing flange 130 and a recess of 140 of a hub 144. The seal element 134 seals against the sealing flange 130, the input shaft 114 and the hub 144. In this arrangement, a separate seal retaining plate is not required to retain the seal element 134.

The outer race 126 can include a plurality of circumferentially-spaced apart stamped retainer tabs 148 pressed against the cover 112 for securing the bearing 118 in place. In other embodiments, the retainer tabs 148 can be omitted and bearing 118 can be piloted on the hub 144 depending on axial forces experienced in the system.

Figure 3:
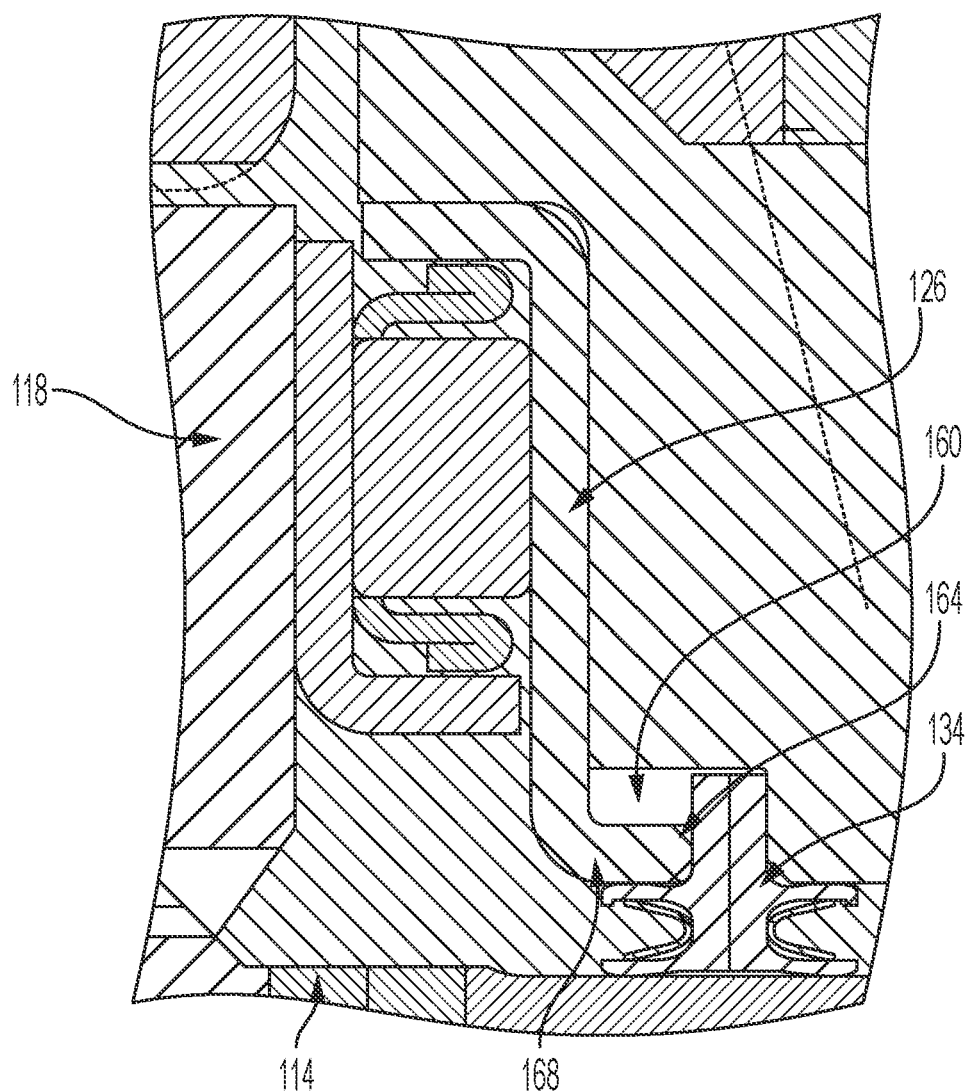
FIG. 3 is a cross-sectional view of a portion of another exemplary torque converter in accordance with the present disclosure.

Turning to FIG. 3, another exemplary sealing arrangement is illustrated. In this embodiment, the outer race 126 is modified to include an additional axially-extending annular flange 160 to accommodate a different seal element 134, sometimes referred to as a spring energized seal. The bearing 118 in this example acts as both a retainer for the seal element 134 and provides the outer diameter sealing surface for the seal. In this regard, an axial end face 164 retains the seal element 134 and a radially-inner circumferential surface 168 of the axially-extending annular flange 160 provides the sealing surface. The axial end face 164 can include a chamfer for easing assembly and seating of the seal element 134.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 110 micro torque converter
112 cover
114 input shaft
118 thrust bearing
122 inner race
126 outer race
128 rolling elements
130 sealing flange
134 seal element
136 axial end face
140 recess
144 hub
148 retainer tabs
160 annular flange
164 axial end face
168 circumferential surface

What is claimed is:

1. A torque converter comprising:
a cover;
an input shaft supported for rotation within the cover;
a bearing coaxially-aligned with a portion of the input shaft;
a hub surrounding the input shaft; and
a seal element interposed between the input shaft and the hub;
wherein the bearing includes a seal retaining flange adapted to cooperate with the hub to define a seal groove in which the seal element is retained.

2. The torque converter according to claim 1, wherein the bearing comprises a thrust bearing.

3. The torque converter according to claim 1, wherein the bearing includes an outer race, and the seal retaining flange extends from the outer race.

4. The torque converter according to claim 3, wherein the seal retaining flange includes a radially-inwardly extending flange.

5. The torque converter according to claim 4, wherein the radially- inwardly extending flange includes an axial end face adapted to engage the seal element.

6. The torque converter according to claim 5, wherein the outer race is L-shape in cross-section.

7. The torque converter according to claim 6, wherein the seal element includes at least one of a square dynamic seal or an o-ring.

8. The torque converter according to claim 3, wherein the outer race includes a plurality of circumferentially-spaced apart retainer tabs.

9. The torque converter according to claim 8, wherein the retainer tabs are stamped.

10. The torque converter according to claim 3, wherein the seal retaining flange further includes an axially-extending flange extending from the radially-inwardly extending flange.

11. The torque converter according to claim 10, wherein the axially- extending flange includes an inner circumferential surface adapted to engage the seal element.

12. The torque converter according to claim 11, wherein the outer race is S-shape in cross-section.

13. The torque converter according to claim 12, wherein the seal element includes a spring energized seal.

14. A bearing comprising:
an inner race;
an outer race; and
a plurality of rolling elements supported between the inner and outer races;
wherein the outer race includes a seal retaining flange extending radially inwardly beyond the inner race for retaining an associated seal element supported on a shaft;
wherein the seal retaining flange further includes an axially-extending flange extending from the radially-inwardly extending flange;
wherein the axially-extending flange includes an inner circumferential surface adapted to engage the associated seal element and an axial end face adapted to engage the associated seal element.

15. The bearing according to claim 14, wherein the seal retaining flange includes a radially-inwardly extending flange.

16. The bearing according to claim 14, wherein the outer race is L- shape in cross-section.

17. The bearing according to claim 14, wherein the outer race is S-shape in cross-section.

18. The bearing according to claim 14, wherein the axial end face includes a chamfer.

* * * * *